(12) United States Patent
Wurzel (10) Patent No.: US 8,797,474 B2
(45) Date of Patent: Aug. 5, 2014

(54) METHODS FOR ASSEMBLING DISPLAY STRUCTURES WITH ALIGNMENT FEATURES

(75) Inventor: Joshua G. Wurzel, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 12/961,460

(22) Filed: Dec. 6, 2010

(65) Prior Publication Data
US 2012/0140143 A1    Jun. 7, 2012

(51) Int. Cl.
*G02F 1/1333* (2006.01)

(52) U.S. Cl.
USPC ............................................... 349/58

(58) Field of Classification Search
USPC .................................................. 349/58
See application file for complete search history.

(56) References Cited

U.S. PATENT DOCUMENTS

| | | | |
|---|---|---|---|
| 6,956,627 B2 | 10/2005 | Lee | |
| 7,274,415 B2* | 9/2007 | Nakayoshi et al. | 349/65 |
| 7,339,635 B2 | 3/2008 | Freking et al. | |
| 7,782,417 B2 | 8/2010 | Ma et al. | |
| 2005/0092816 A1* | 5/2005 | Lee et al. | 228/180.22 |
| 2009/0135583 A1 | 5/2009 | Hillman et al. | |
| 2010/0141863 A1 | 6/2010 | Chang | |
| 2012/0062825 A1* | 3/2012 | Seo et al. | 349/122 |
| 2012/0140143 A1* | 6/2012 | Wurzel | 349/62 |
| 2012/0256890 A1* | 10/2012 | Araki et al. | 345/204 |

OTHER PUBLICATIONS

Wurzel, U.S. Appl. No. 12/558,193, filed Sep. 11, 2009.

* cited by examiner

*Primary Examiner* — Timothy L Rude
(74) *Attorney, Agent, or Firm* — Treyz Law Group; G. Victor Treyz; David C. Kellogg (57) ABSTRACT

Displays for electronic devices may be provided with display structures such as liquid crystal display module structures. Backlight structures may provide backlight. A cover glass may be mounted above a liquid crystal display module. When assembling a display, layers of components may be attached to one another using adhesive. Alignment features may be incorporated into the layers of components to ensure that components are laterally and rotationally aligned before being secured to each other. A liquid crystal display module may have a thin-film transistor layer on which alignment marks are formed. Backlight structures may include a light guide plate, a chassis that receives the light guide plate, and a reflector. The chassis may have alignment openings corresponding to the alignment marks on the thin-film transistor layer. The reflector may have portions that overlap the alignment holes or may have portions that are recessed and do not overlap the alignment holes.

2 Claims, 12 Drawing Sheets

METHODS FOR ASSEMBLING DISPLAY STRUCTURES WITH ALIGNMENT FEATURES

BACKGROUND

This relates generally to displays for electronic devices, and more particularly, to displays with alignment features.

Electronic devices often include displays. For example, an electronic device may have a touch screen display that is based on a backlit liquid crystal display module. This type of display typically has numerous layered components. For example, a backlight unit may be used to provide backlight and a liquid crystal display module may contain an array of addressable image pixels that are illuminated by the backlight from the backlight unit. A cover glass or other layer may be used to cover the liquid crystal display module and the backlight unit when mounted within the housing of the device.

Arrangements such as these may be used to form displays for a variety of devices. During manufacturing, it may be desirable to ensure that the layers are satisfactorily attached to each other. For example, it may be desirable to attach components such as a backlight unit, liquid crystal display module, and cover glass structures to one another. For proper operation, it is generally desirable for the layers of components in a display to be aligned with one another. If care is not taken, display components will be misaligned and the display will not function properly.

It would therefore be desirable to be able to provide improved ways in which to assemble displays for electronic devices.

SUMMARY

Displays for electronic devices may be provided with display structures such as liquid crystal display structures. A liquid crystal display module for a display may include a color filter layer, a layer of liquid crystal material, and a thin-film transistor layer.

A cover glass may be mounted above a liquid crystal display module. Backlight structures may provide backlight that passes through the liquid crystal display module and the cover glass.

When assembling a display, layers of components such as a cover glass layer, a liquid crystal display module structures, and backlight layers may be attached to one another using adhesive. Alignment features may be incorporated into the layers of components to ensure that components are laterally and rotationally aligned before the components are secured to each other.

A liquid crystal display module may have alignment marks. The alignment marks may be formed on the surface of the thin-film transistor layer in the liquid crystal display module.

Backlight structures for a display may include a light guide plate, a chassis that receives the light guide plate, and a reflector. The chassis may have alignment openings corresponding to the alignment marks on the thin-film transistor layer. The reflector may have portions that overlap the alignment holes or may have portions that are recessed and do not overlap the alignment holes.

Further features of the invention, its nature and various advantages will be more apparent from the accompanying drawings and the following detailed description of the preferred embodiments.

DETAILED DESCRIPTION

Electronic devices may include displays. Displays may be used to display visual information such as text and images to users.

Figure 1A:
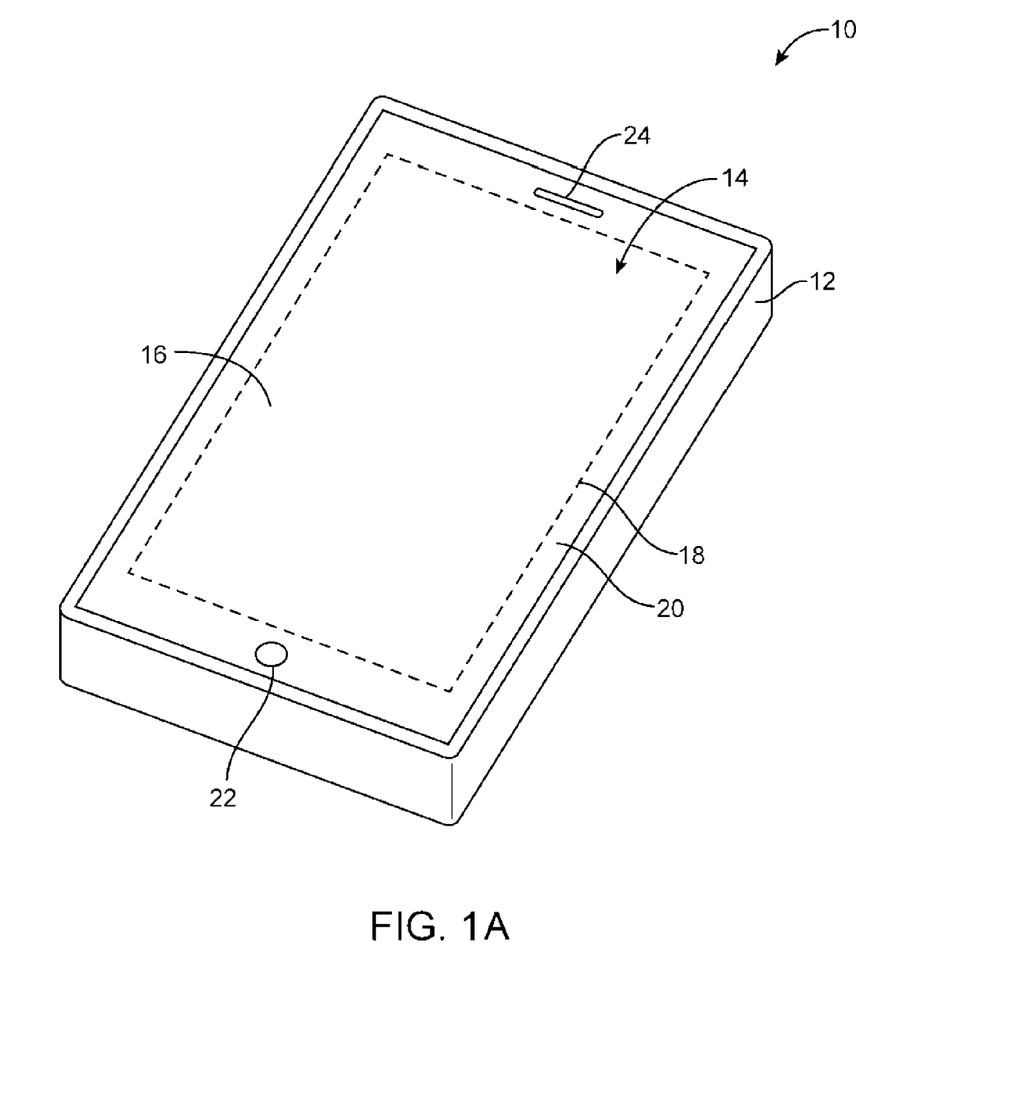
FIGS. 1A, 1B, and 1C are views of illustrative electronic devices that include displays in accordance with an embodiment of the present invention.
Figure 1B:
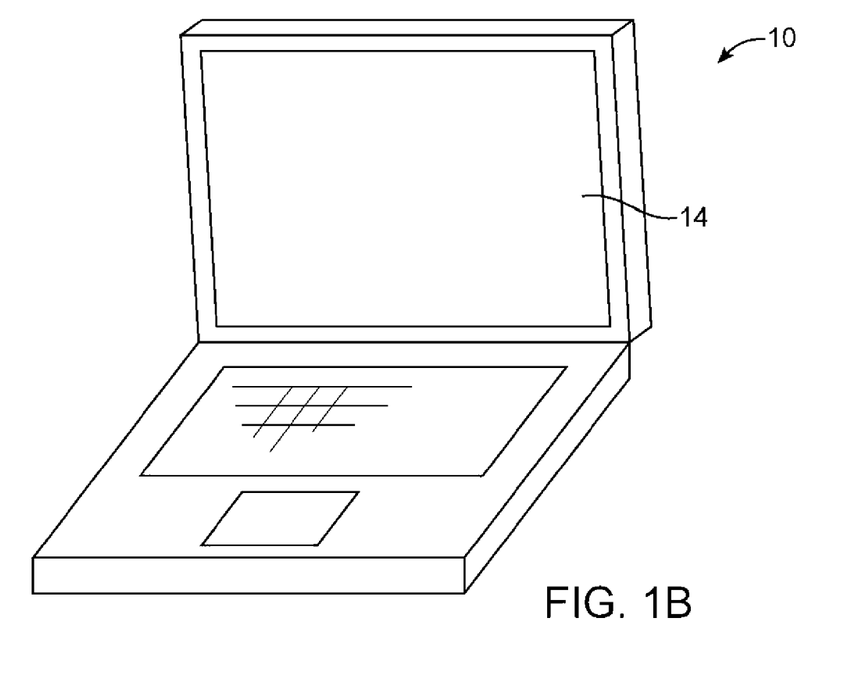
Figure 1C:
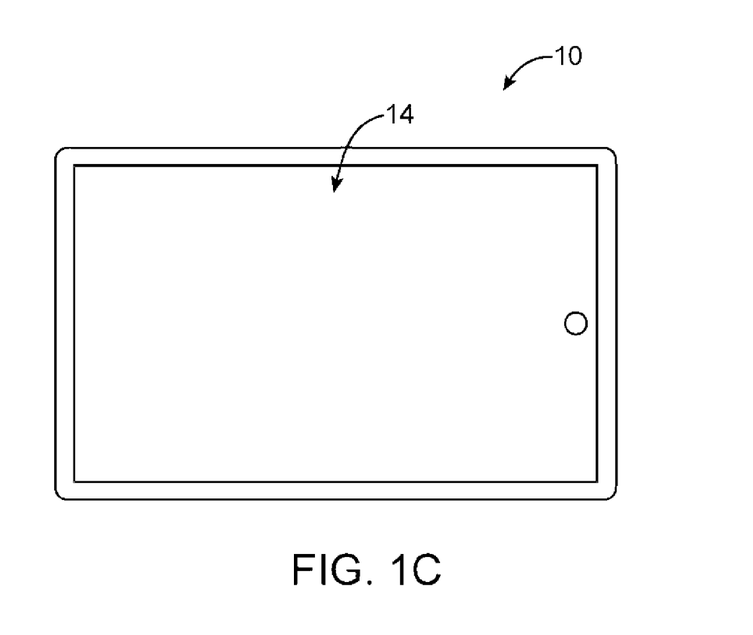

Illustrative electronic devices that may be provided with displays are shown in FIGS. 1A, 1B, and 1C. FIG. 1A shows how electronic device 10 may have the shape of a handheld device. FIG. 1B shows how electronic device 10 may be a laptop computer with an upper housing and a lower housing that are attached with a hinge. FIG. 1C shows how electronic device 10 may be a tablet computer. These are merely illustrative examples. Electronic devices such as illustrative electronic device 10 of FIGS. 1A, 1B, and 1C may be laptop computers, tablet computers, cellular telephones, media players, other handheld and portable electronic devices, smaller devices such as wrist-watch devices, pendant devices, headphone and earpiece devices, other wearable and miniature devices, or other electronic equipment.

As shown in FIG. 1A, device 10 may have a housing such as housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may have one or more displays such as display 14. Display 14 may, for example, be a liquid crystal display. Display 14 may, if desired, include capacitive touch sensor electrodes for a capacitive touch sensor array or other touch sensor structures (i.e., display 14 may be a touch screen).

A cover glass layer may cover the surface of display 14. The cover glass layer may be formed from clear plastic, glass, or other transparent materials. If desired, the cover glass layer may be omitted and other structures in display 14 such as a polarizer layer or a color filter array layer may serve as the outermost layer of display 14. The central portion of display 14 (i.e., portion 16 of FIG. 1A, which lies within the boundary of dashed line rectangle 18 of FIG. 1A) may contain active image pixels and is sometimes referred to as the active region of display 14. The peripheral ring-shaped area that surrounds dashed line 18 (i.e., portion 20 of display 14) does not generally include active image pixels and is sometimes referred to as the inactive region of display 14.

Openings in housing 12 may be used to form input-output ports, microphone ports, speaker ports, button openings, media ports, etc. Opening 24 in the cover glass for display 14 may be used to form a speaker port for device 10. Buttons and other components such as button 22 may protrude through one or more other openings in the cover glass.

Figure 2:
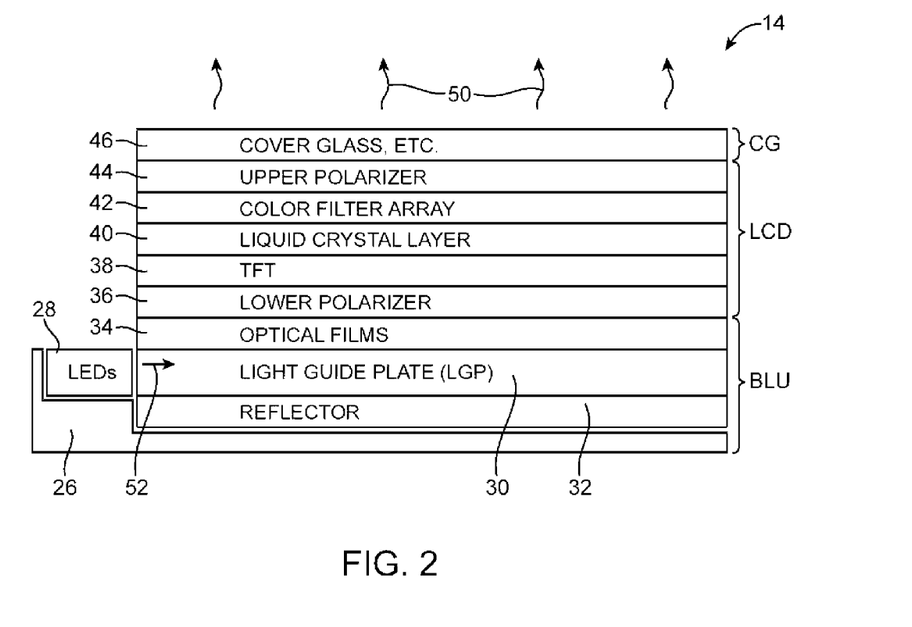
FIG. 2 is a cross-sectional side view of an illustrative display showing layers of components that may be used within the display in accordance with an embodiment of the present invention.

A cross-sectional side view of an illustrative configuration that may be used for display 14 is shown in FIG. 2. As shown in FIG. 2, display 14 may include backlight structures such as backlight unit BLU for producing backlight 50. During operation, backlight 50 travels outwards (vertically upwards in the orientation of FIG. 2) and passes through image pixel structures in liquid crystal display module LCD. In configurations of the type shown in FIG. 2, the outermost layer of display 14 is formed by cover glass layer CG. If desired, other layers can be used to form the top layer of display 14 (e.g., a touch panel, cover plastic, etc.).

Backlight unit BLU may have a chassis such as chassis 26. Chassis 26 may be formed from plastic, thixomolded magnesium, die-cast aluminum, machined metals, machined plastics, fiber-composite materials, metal alloys, fiber-based composites such as carbon-fiber composites, combinations of metals, polymers, fiber-composites, and other materials, ceramics, glass, organic materials, or other suitable materials. Chassis 26 may have an interior shape that receives components such as light-emitting diodes 28, light guide plate 30, and, if desired, reflector 32. Optical films 34 such as a diffuser layer and other films may be mounted over light guide plate (LGP) 34. Light guide plate 30 may be formed from a layer of clear material such as a sheet of acrylic, polycarbonate, or other polymer. Reflector 32 may be formed from a reflective substance such as white polyester.

Light-emitting diodes 28 may be attached to a flexible printed circuit substrate ("flex circuit") such as a layer of polyimide. When mounted in chassis 26, light from light-emitting diodes 28 may be emitted in direction 52 and may be guided within light guide plate 34 by total internal reflection. Some of this light may escape upwards and may serve as backlight 50 for display 14. Reflector 32 may reflect any light that escapes plate 34 in the downwards direction up through display module LCD to add to the strength of backlight 50.

Liquid crystal display module LCD may have upper and lower polarizers such as upper polarizer 44 and lower polarizer 36. Thin-film transistor layer 38 may include an array of thin-film transistors and associated pixel electrodes formed on a transparent substrate such as a clear glass layer. A driver integrated circuit may be mounted on thin-film transistor layer 38 to drive control signals into the circuitry on the thin-film transistor layer 38. When a signal is applied to the electrode structures of a given pixel, an electric field is created in an associated portion of liquid crystal layer 40 that changes the polarization of that portion of layer 40. The polarization change that is produced (in combination with the polarization effects of upper and lower polarizer layers 44 and 36) produce changes in light intensity for the pixel. Color filter array layer 42 may contain an array of colored filter elements on a transparent substrate such as a glass substrate. Layer 42 may be used to impart color to the pixels. By controlling the states of each of the pixels in liquid crystal display module LCD, images may be displayed on display 14.

Cover glass layers CG may include a layer of cover glass such as a layer of glass, touch sensor layers (e.g., transparent indium tin oxide capacitor electrodes our other touch sensor electrodes formed on a cover glass substrate or a separate transparent substrate), and other display layers.

Figure 3:
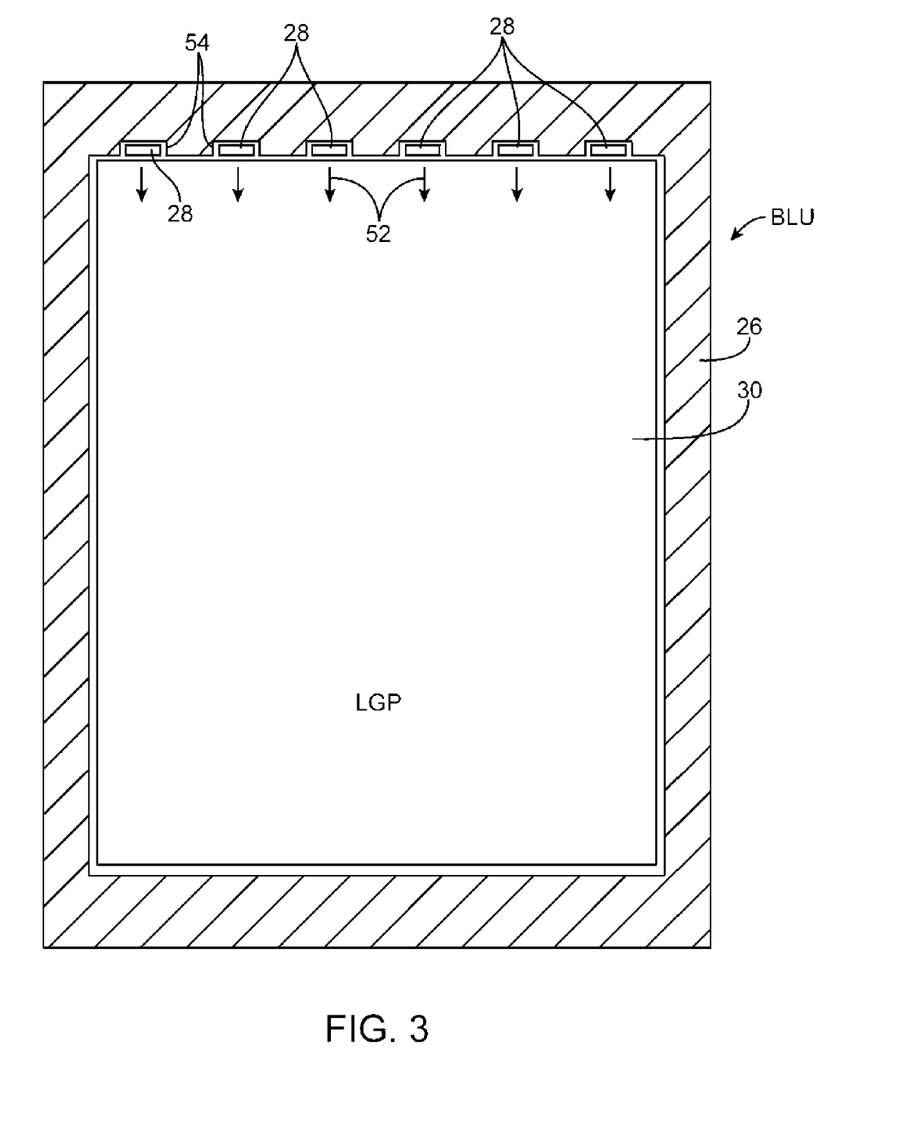
FIG. 3 is a top view of components in a backlight unit for a display in accordance with an embodiment of the present invention.

FIG. 3 is a top view of parts of an illustrative configuration that may be used for forming backlight unit BLU of FIG. 2. As shown in FIG. 3, backlight unit BLU may include a chassis such as chassis 26. A rectangular recess in chassis 26 may be used to receive rectangular light guide plate 30. Light emitting diodes 28 may be mounted within notches 54 in chassis 26. Light emitting diodes 28 may emit light in direction 52 that travels within light guide plate 30 before being scattered upwards (out of the page in the orientation of FIG. 3) through liquid crystal display module LCD to serve as backlight 50 for display 14.

Figure 4:
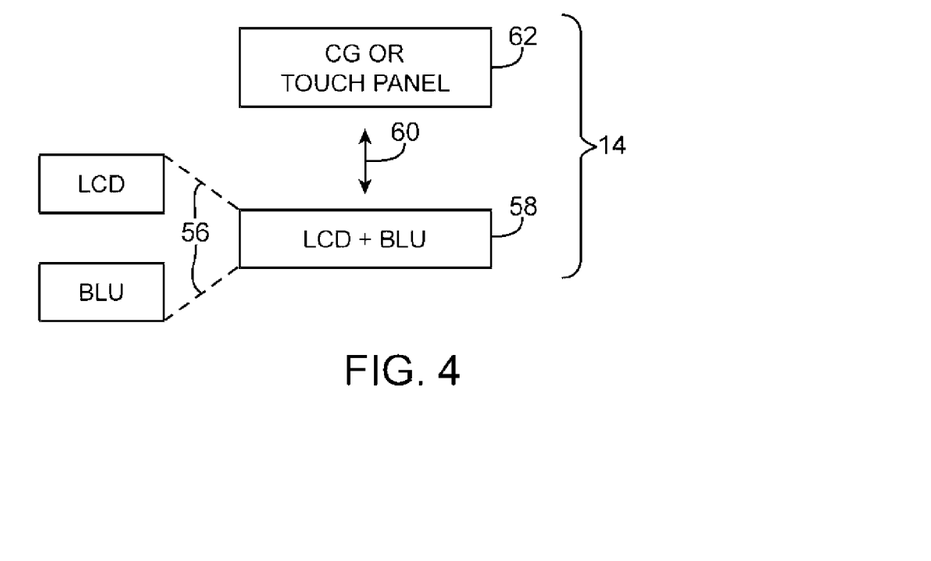
FIG. 4 is a diagram showing how a liquid crystal display module and backlight unit can be assembled to form an assembly that is mounted to a layer such as a polarizer or cover glass when forming a display in accordance with an embodiment of the present invention.

The layers of components that make up display 14 may be assembled in any suitable order. With one suitable arrangement, which is shown in FIG. 4 as an example, liquid crystal display module LCD and backlight unit BLU are combined to form assembly 58, as indicated by dashed lines 56. For example, liquid adhesive, pressure sensitive adhesive, other adhesive materials, or other attachment mechanisms may be used in attaching liquid crystal display module LCD and backlight unit BLU to form assembly 58. Once assembly 58 has been formed, the remaining portions of display 14 (e.g., display structures 62 such as cover glass layer 46 or a touch panel layer) may be attached to assembly (e.g., using adhesive or other attachment mechanisms), as indicated schematically by line 60.

Component layer attachment processes such as the process of attaching module LCD and backlight unit BLU (lines 56) and in attaching assembly 58 and cover glass CG may be performed using positioning equipment, an autoclave (e.g., to help cure adhesive), ultraviolet (UV) light adhesive curing equipment, or other suitable equipment.

Figure 5:
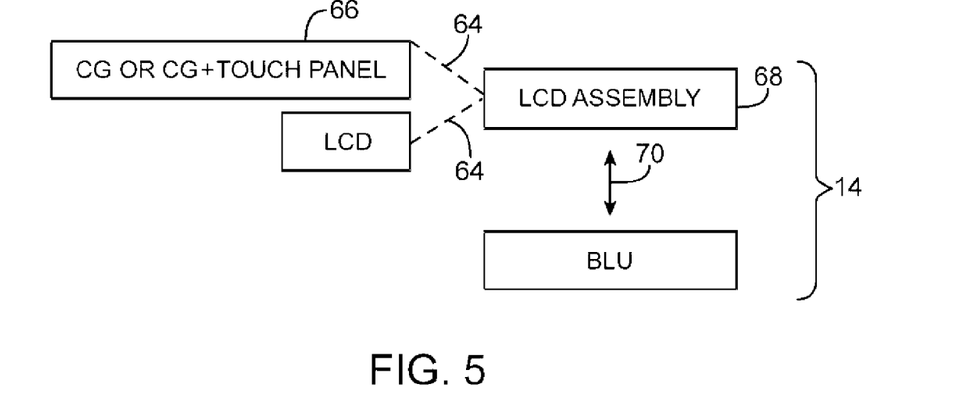
FIG. 5 is a diagram showing how display components such as a cover glass layer or cover glass and polarizer layer structures can be combined with a liquid crystal display module to form an assembly that is mounted to a backlight unit in accordance with an embodiment of the present invention.

Another suitable arrangement for assembling the components that make up display 14 is shown in FIG. 5. With the arrangement of FIG. 5, cover glass CG and/or other display layers such as a touch panel (display structures 66) may be combined with liquid crystal display module LCD to form assembly 68, as indicated by lines 64. After forming assembly 68, assembly 68 may be attached to backlight unit BLU, as indicated by line 70. As with the structures of FIG. 4, the component layers of FIG. 5 may be attached to one another using positioning equipment, using an optional autoclave (e.g., to help cure adhesive), using ultraviolet (UV) light adhesive curing equipment, or other suitable equipment.

Figure 6:
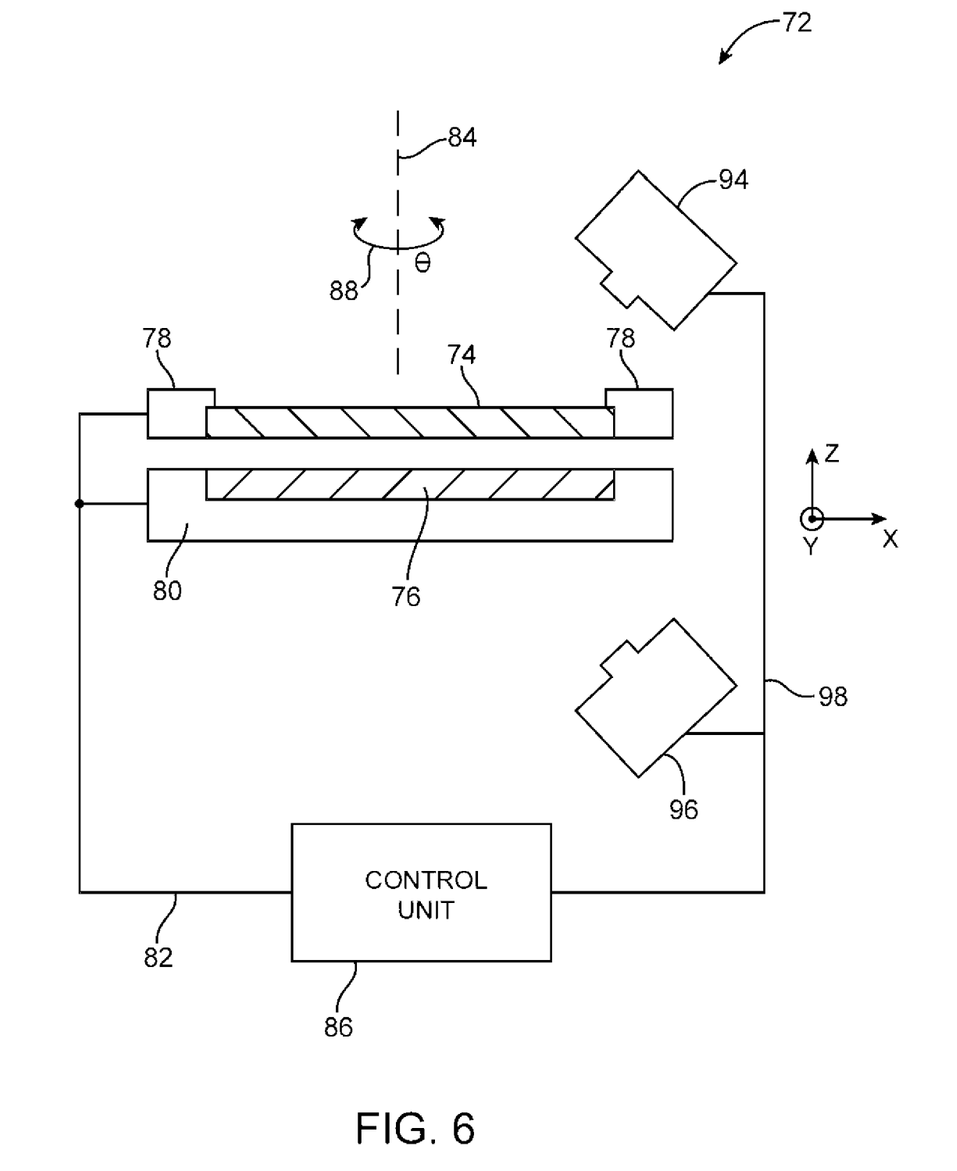
FIG. 6 is a diagram of assembly equipment that may be used in aligning and attaching layers of display components in accordance with an embodiment of the present invention.

Assembly equipment of the type shown in FIG. 6 may be used in attaching layers of components to one another when forming display 14. In the example of FIG. 6, assembly equipment 72 includes positioning equipment 78 and 80. Positioning equipment 78 may be used to position component 74. Positioning equipment 80 may be used to position component 76.

Positioning equipment 78 and 80 may include items such as fixed stages, rotating stages, actuators that control the position of linearly translating stages, or other suitable positioning equipment. Positioning equipment 78 and/or positioning equipment 80 may be controlled by control signals from control unit 86 that are received over control path 82. Control unit 86 may issue control signals in response to automatically executed control code (e.g., a control program implemented on storage and processing circuitry within control unit 86) or may be issue control signals in response to input from a user. The control signals may direct equipment 78 and/or 80 to adjust the position of component 74 and/or 76 with respect to angle (i.e., rotational angle θ around rotational axis 84), horizontal dimensions X and Y, and vertical dimension Z. If desired, positioning equipment 78 and 80 may be manually adjusted.

Optical equipment 94 and 96 may include cameras, microscopes, illuminating equipment such as lamps, and other visual inspection equipment. Users can interact manually with equipment 94 and 96. For example, a user may use a microscope or a camera that is connected to a monitor to view the position of components 74 and 76. Alignment features such as metal alignment marks and alignment holes may be formed on components 74 and 76. During alignment operations, the position of positioning equipment 78 and 80 (and therefore the position of components 74 and 76) may be adjusted by the user. If desired, control unit 86 may make adjustments to the position of equipment 78 and 80 and components 74 and 76 based on digital image data received from digital cameras within equipment 94 and 96. Digital image data may be received by control unit 86 via path 98 and may be converted into position information using machine vision techniques. Position data may also be obtained by control unit 86 using position sensors (e.g. sensors that measure the locations of components 74 and 76).

Based on manual input and/or automated processing of sensor and camera data from control unit 86, control commands (and/or manual input) may be used in controlling positioning equipment 74 and 76 so as to adjust the positions of components 74 and 76 relative to one another. In a typical scenario, the X and Y positions of components 74 and 76 are adjusted to ensure that components 74 and 76 are laterally aligned and the rotational positions of components 74 and 76 are adjusted to ensure that the components 74 and 76 are rotationally aligned. Following lateral and rotational alignment, the Z (vertical) position of components 74 and 76 can be reduced until components 74 and 76 come into contact with each other. Pressure sensitive adhesive, liquid adhesive, UV-cured adhesive, other adhesive, or other attachment mechanisms may be used in attaching components 74 and 76 to each other.

In making adjustments to X, Y, Z, and θ, the position of component 74 may be controlled using positioning equipment 78, the position of component 76 may be controlled using positioning equipment 80, or the positions of both components 74 and 76 may be adjusted by using both equipment 78 and equipment 80. Components 74 and 76 may each include one or more structures associated with components such as liquid crystal display module LCD, backlight unit BLU, cover glass CG, and assemblies that include structures from one or more of these components. For example, component 74 may include the structures of component 62 of FIG. 4 and component 76 may include the structures of assembly 58 of FIG. 4 or component 74 may include the structures of assembly 68 of FIG. 5 and component 76 may include the structures of backlight unit BLU of FIG. 5 (as examples). If desired, other components may be aligned and attached to each other by compressing these components towards one another along vertical dimension Z using equipment 72. The attachment of the sets of components shown in FIGS. 4 and 5 to form display 14 is merely illustrative.

Alignment features may be used to facilitate alignment of the structures of liquid crystal display module LCD and backlight unit BLU during assembly with equipment 72. For example, one or more alignment marks may be provided on a layer within the liquid crystal display module such as thin-film transistor layer 38. The alignment mark or marks may, as an example be formed from patterned metal (e.g., metal in the shape of a cross, a dot, lines, circles, shapes with curved and straight sides, squares, shapes with perpendicular straight sides and no curved sides, etc.).

The alignment marks on thin-film transistor layer 38 (or other appropriate layer within module LCD) may each be aligned with a corresponding alignment feature in one or more of the layers of backlight unit BLU. For example, chassis 26 or one or more other layers in backlight unit BLU may have one or more alignment openings such as one or more alignment holes. Each alignment hole may have a circular shape, a square shape, a shape with straight sides, a shape with curved sides, or a shape with a combination of straight and curved sides, or other suitable alignment opening shape.

During assembly of display 14 using equipment 72, the alignment marks on thin-film transistor layer 38 may be aligned with the alignment holes of chassis 26. Once aligned, equipment 72 may be used to press layers of components that include layer 38 and chassis 26 together, so that adhesive (e.g., pressure sensitive adhesive or other adhesive) forms a bond between the layers of components. For example, module LCD and backlight unit BLU may be mounted to each other. Following this assembly process (e.g., to form assembly 58), components 62 (e.g., a cover glass layer or upper polarizer layer) may be attached, as indicated by line 60 of FIG. 4 (as an example).

Figure 7:
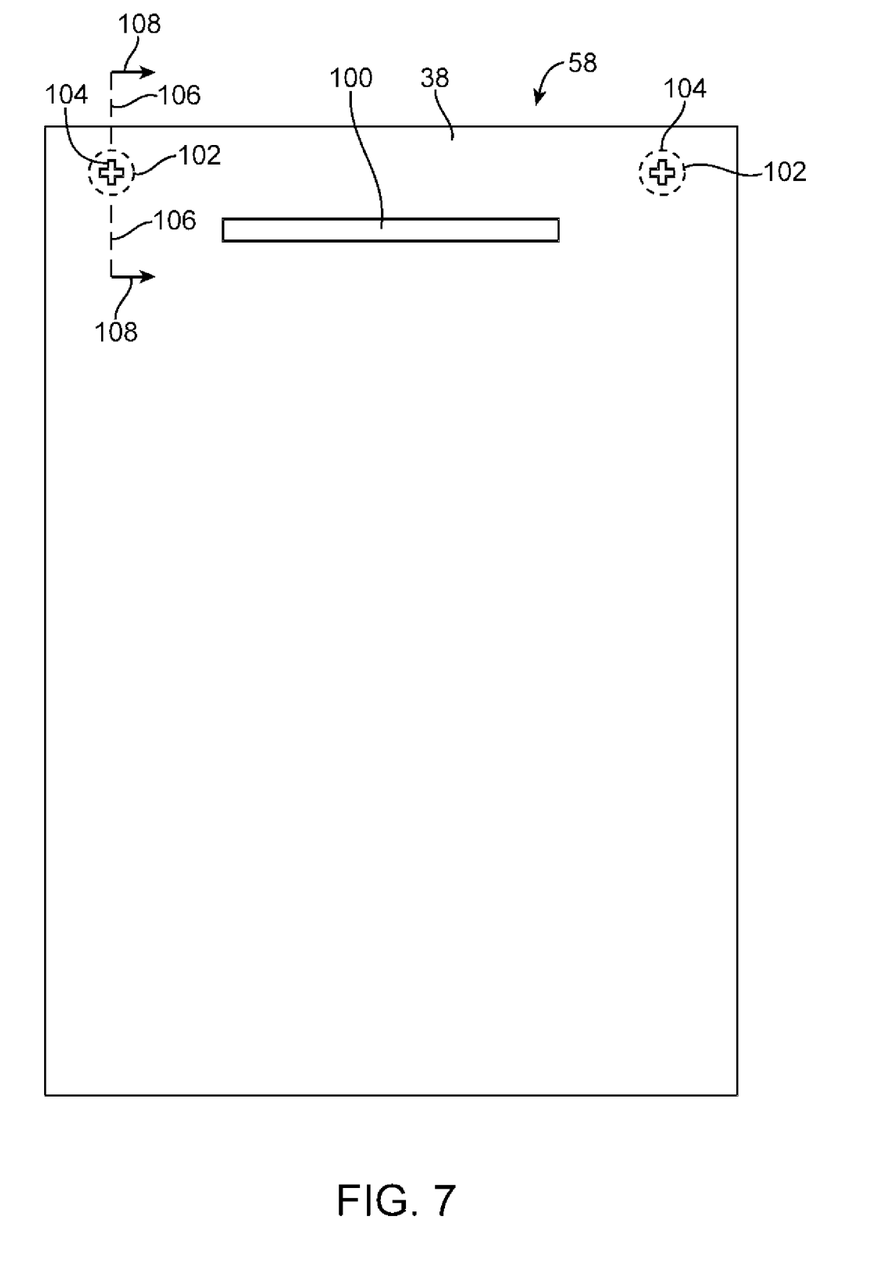
FIG. 7 is a top view of an illustrative thin-film transistor layer for a display module that has been aligned with and attached to a backlight unit to form an assembly in accordance with an embodiment of the present invention.

A top view of a portion of an illustrative assembly (e.g., assembly 58 of FIG. 4) that includes a liquid crystal display module in alignment with a backlight unit is shown in FIG. 7. In the example of FIG. 7, assembly 58 includes a liquid crystal display module (LCD) having thin-film transistor layer 38. A display driver integrated circuit such as integrated circuit 100 may be mounted on thin-film transistor layer 38. Alignment marks 104 such as metal crosses or other suitable alignment mark structures may be formed on the surface of thin-film transistor layer 38. The chassis of backlight unit BLU (i.e., chassis 26 of FIG. 2) may have alignment openings 102 corresponding to alignment marks 104. During alignment operations, a user may use a camera or other optical equipment such as equipment 94 to center alignment marks 104 within alignment openings 102 and thereby align the structures of liquid crystal display module LCD such as layer 38 to the structures of backlight unit BLU such as chassis 26.

Figure 8:
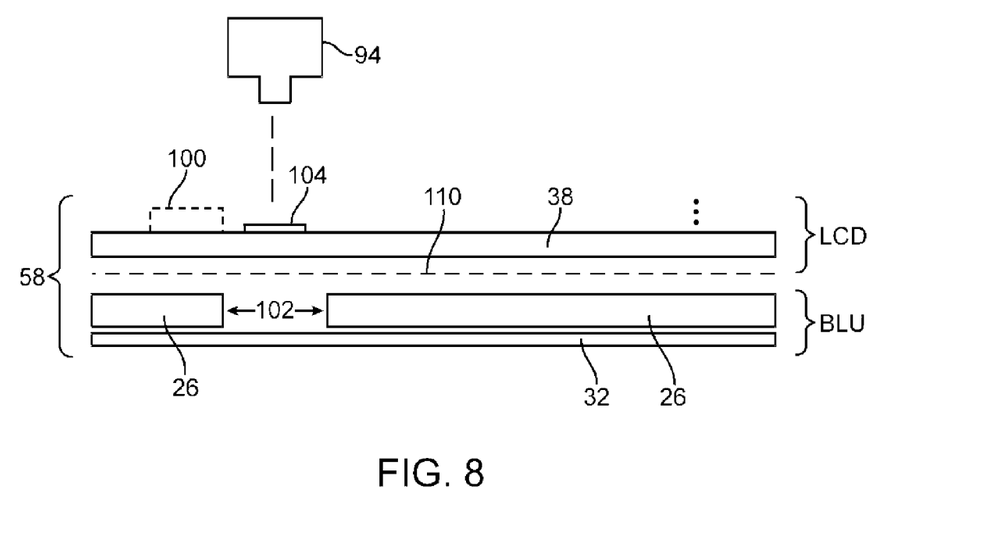
FIG. 8 is a cross-sectional side view of the components of FIG. 7 during assembly in accordance with an embodiment of the present invention.

A cross-sectional side view of the structures of FIG. 7 taken along line 106-106 and viewed in direction 108 is shown in FIG. 8. As shown in FIG. 8, during the process of forming assembly 58, liquid crystal display module structures such as layer 38 may be laterally and rotationally aligned to backlight unit structures such as chassis 26 and reflector 32. Alignment may be achieved by adjusting the relative rotational and lateral position of layers such as layer 38 in module LCD to layers such as layers 26 and 32 in backlight unit BLU using equipment 72 of FIG. 6 while observing the relative position of alignment marks 104 and corresponding alignment openings 102. Once marks 104 and openings 102 are properly aligned, backlight unit BLU and liquid crystal display module LCD may be attached to one another using pressure sensitive adhesive 110.

In the illustrative arrangement of FIG. 8, liquid crystal display module LCD was aligned to backlight unit BLU using a camera or other visual inspection apparatus 94 that was located above assembly 58, because reflector layer 32 blocked alignment holes 102 from view from the bottom of assembly 58. In some assembly scenarios, it may be desirable to view alignment features from below the display. For example, it may be desirable to view alignment features from below the display in scenarios in which cover glass CG is attached to liquid crystal display module LCD to form assembly 68 (FIG. 5) before aligning and attaching back light unit BLU. Assembly arrangements of the type shown in FIG. 5 may be advantageous, because they avoid the need for backlight unit BLU to withstand the rigors of the process steps involved in attaching assembly 58 to structures 62 of FIG. 4 (e.g., process steps such as lamination steps that may involve use of a vacuum, autoclave, etc.).

In arrangements of the types shown in FIG. 5, however, the cover glass in assembly 68 may have a peripheral masking layer (e.g., a ring of black ink in inactive region 20). The layer of black ink may block alignment features such as alignment marks 102 and alignment holes 104 of FIG. 7 from view from above the display. To perform alignment operations, the alignment marks 102 and alignment holes 104 can be viewed from below.

Figure 9:
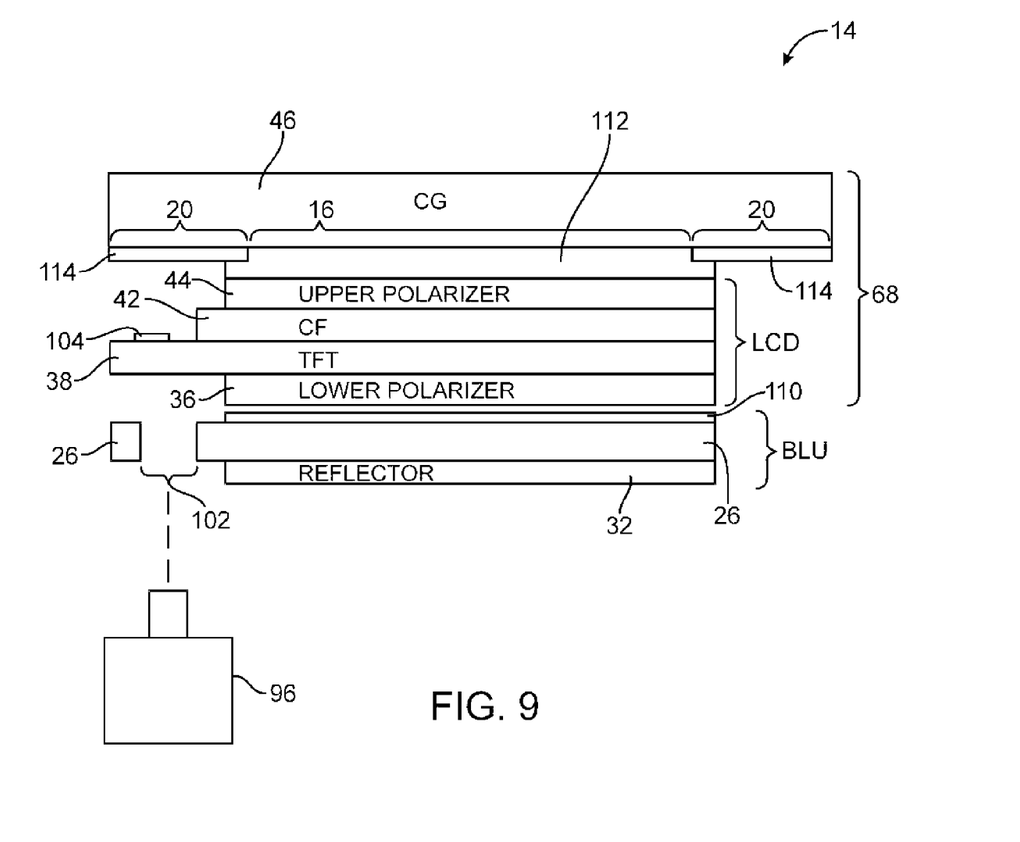
FIG. 9 is a cross-sectional side view of an illustrative display module and cover glass assembly that is being aligned with and attached to a backlight unit for a display in accordance with an embodiment of the present invention.

An illustrative alignment arrangement in which the alignment features are viewed from below the display is shown in FIG. 9. As shown in FIG. 9, display 14 may be assembled from components such as backlight unit BLU, liquid crystal display module LCD, and cover glass CG using an optical inspection apparatus such as a camera, microscope, or other optical inspection equipment 96 that is located below display 14. During alignment operations, equipment 72 may be used to position assembly 68 (e.g., an assembly of the type shown in FIG. 5 that includes cover glass layer CG and liquid crystal display module LCD) relative to the structures of backlight unit BLU. A layer of adhesive such as adhesive 112 (e.g., liquid adhesive that is cured thermally or by application of ultraviolet light or other suitable adhesive), may be used in attaching cover glass 46 to upper polarizer 44 and the other structures of liquid crystal display module LCD to form assembly 68.

A layer of black ink or other opaque masking material 114 may be used to hide internal display components from view. Layer 114 may be formed in a peripheral ring around the interior surface of cover glass 46 in inactive region 20. Active region 16 of display 14 may be unobstructed by layer 114.

Alignment marks 104 (e.g., metal cross-shaped marks or other marks) may be formed on one or more layers of the structures of liquid crystal display module LCD. For example, alignment marks 104 may be formed on the upper surface of thin-film transistor layer 38. The substrate material of thin-film transistor layer 38 may be transparent to allow light from backlight unit BLU to pass through module LCD. For example, the thin-film transistor layer 38 may be formed from a clear glass substrate or other clear material (e.g., polymer). Because thin-film transistor layer 38 is transparent, the positions of alignment marks 104 can be viewed from beneath thin-film transistor layer 38. Chassis 26 in backlight unit BLU may have alignment openings 102 such as circular alignment holes that correspond to alignment marks 104. Reflector 32 may be recessed, provided with holes, or otherwise configured so as not to overlap with openings 102 (while continuing to overlap active region 16). This allows alignment marks 104 and openings 102 to be viewed from beneath display 14 (e.g., using optical inspection equipment 96 such as a microscope and/or camera, as described in connection with FIG. 6).

Figure 10:
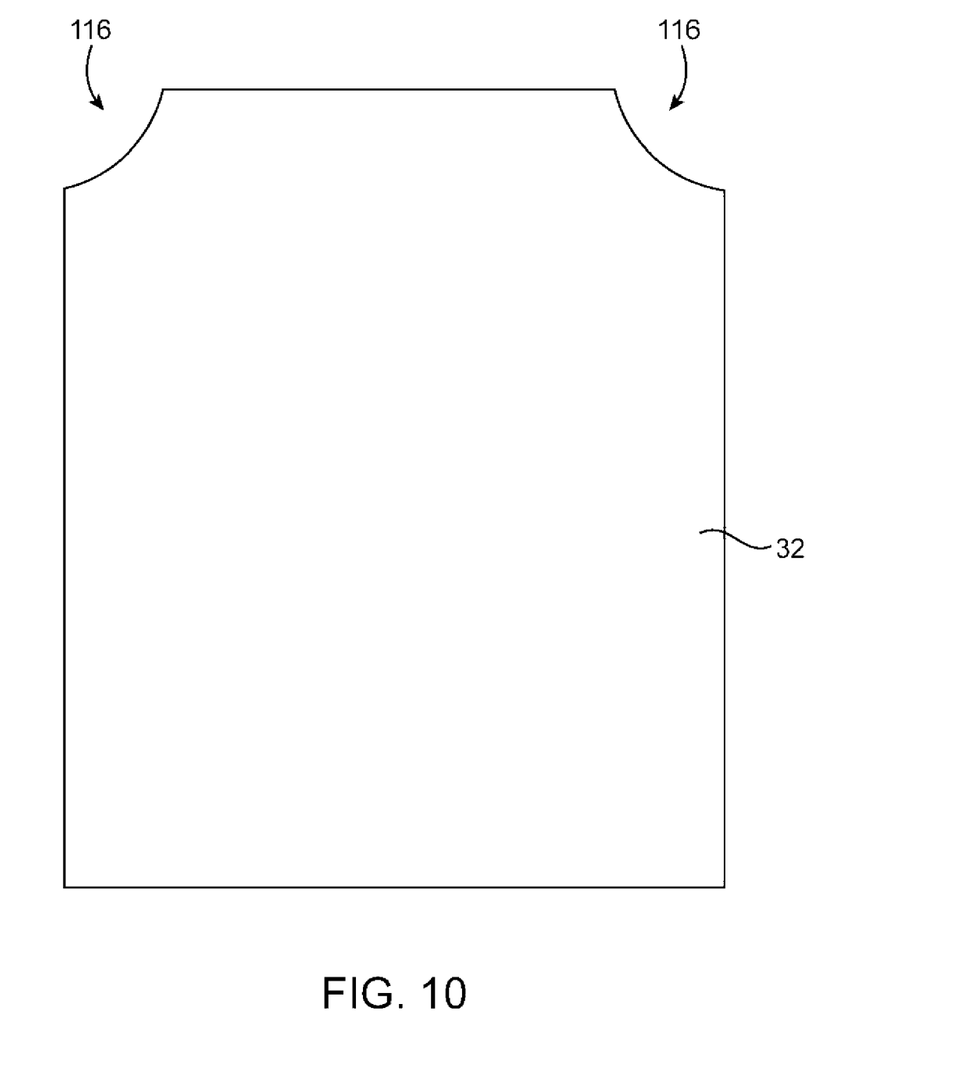
FIG. 10 is a top view of an illustrative reflector layer for a backlight unit of the type shown in FIG. 9 in accordance with an embodiment of the present invention.

FIG. 10 is a top view of reflector 32 of FIG. 9, showing how reflector 32 may have recessed portions (openings) 116 that uncover (i.e., that do not overlap and thus expose) openings 102 and that therefore allow alignment openings 102 in chassis 26 and alignment marks 104 on thin-film transistor layer 38 to be viewed from below (as shown in FIG. 9).

Figure 11:
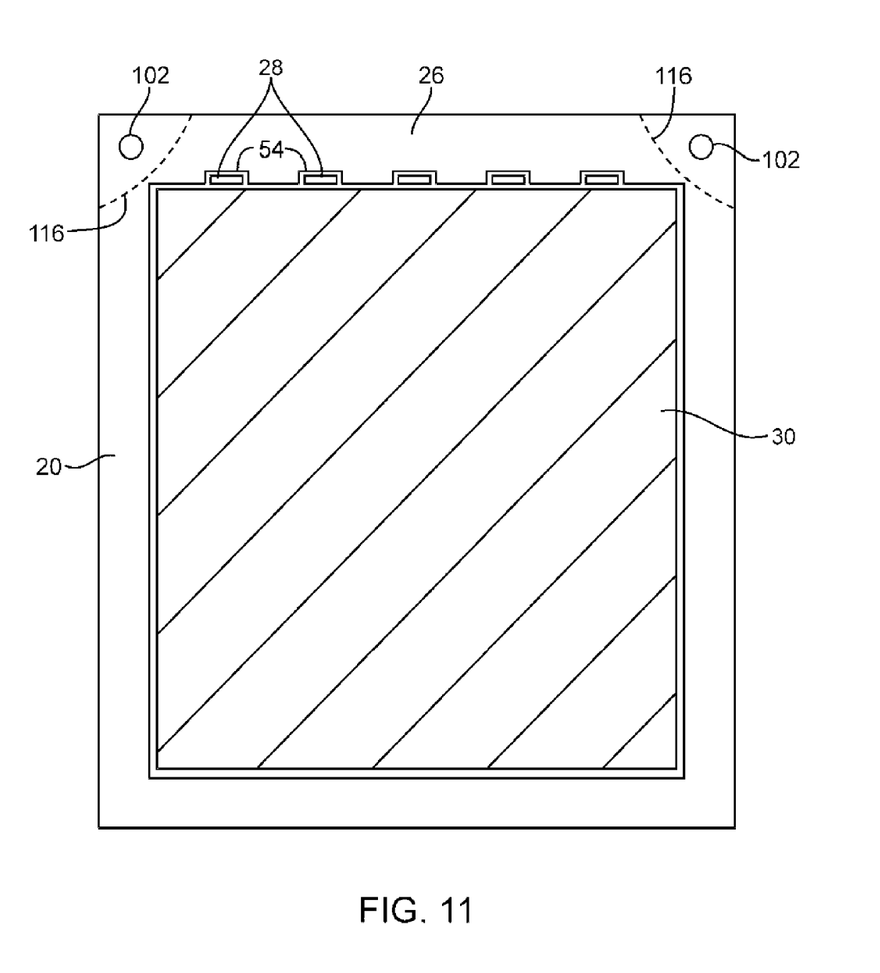
FIG. 11 is a top view of illustrative backlight unit chassis showing how the chassis may have alignment holes in accordance with an embodiment of the present invention.

FIG. 11 is a top view of portions of an illustrative backlight unit such as backlight unit BLU of FIG. 9. As shown in FIG. 11, light guide plate 30 may be mounted within a rectangular opening in chassis 26. Notches 54 in chassis 26 may receive light-emitting diodes 28. Alignment openings 102 (e.g., circular holes or other suitable openings) may be formed in the corners of chassis 26 at locations that overlap recesses 116 or other openings in reflector 32 (FIG. 10).

Figure 12:
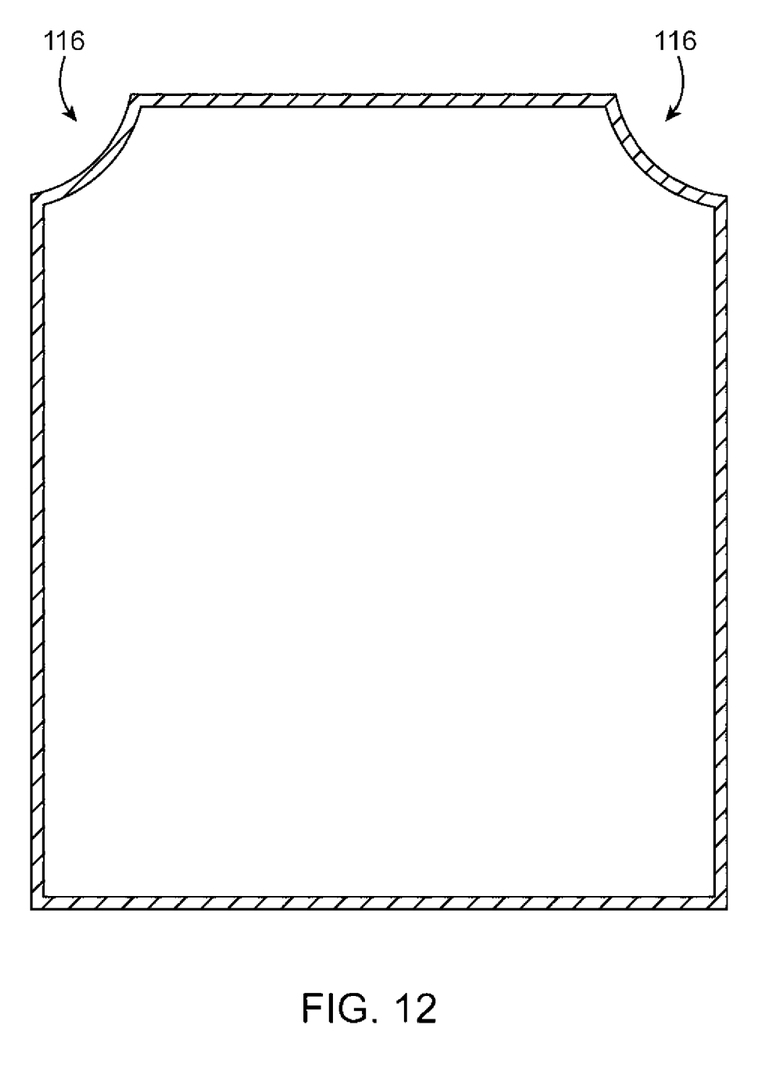
FIG. 12 is a top view of a ring of adhesive that may be used to attach a backlight unit chassis of the type shown in FIG. 11 to an assembly that includes a liquid crystal display module in accordance with an embodiment of the present invention.

FIG. 12 is a top view of a ring of adhesive such as adhesive ring 110 of FIG. 9. Adhesive 110 may have a shape that surrounds active area 16 of display 14 without blocking display 14 (e.g., adhesive 110 may lie under inactive region 20 of display 14 and may have a central opening that is substantially aligned with active area 16). Adhesive 110 may be formed from a pressure sensitive adhesive material or other material that can be used to attach backlight unit BLU to assembly 68 once alignment between backlight unit BLU and assembly 68 has been achieved. The ring shape of adhesive 110 may have recessed portions that are shaped to follow the contours of openings 116 (i.e., by matching the shape of the recesses at the corners of adhesive 110 to the shape of recesses 116 in reflector 32).

Once thin-film transistor layer 38 of FIG. 9 is in alignment with chassis 26 (i.e., in a configuration in which alignment marks 104 on thin-film transistor layer 38 have been aligned with alignment openings 102 in chassis 26), thin-film transistor layer 38 and chassis 26 will appear as shown in FIG. 7.

The foregoing is merely illustrative of the principles of this invention and various modifications can be made by those skilled in the art without departing from the scope and spirit of the invention.

What is claimed is:

1. A display comprising:
    display structures that display images;
    backlight structures that produce backlight that passes through the display structures, wherein the display structures include at least one substrate layer with alignment marks, wherein the backlight structures include corresponding alignment features, wherein the backlight structures includes a light guide plate and a chassis for the light guide plate, and wherein the alignment features are associated with the chassis; and
    a transparent cover disposed over the display structures, wherein the transparent cover comprises a peripheral masking layer disposed over inactive peripheral regions of the display structures, wherein the alignment features comprises alignment holes in the chassis, and wherein the alignment marks of the substrate layer of the display structures are disposed between portions of the peripheral masking layer and the alignment features associated with the chassis of the backlight structure such that the peripheral masking layer blocks the alignment marks and the alignment features from being visible from above the display.

2. The display defined in claim 1 wherein the display structures comprise a liquid crystal display module, wherein the substrate layer comprises a thin-film transistor layer within the liquid crystal display module, and wherein the alignment marks comprise metal structures on the thin-film transistor layer.

* * * * *